Dec. 3, 1957 N. E. NILSSON 2,815,404

CONNECTION FOR AUTOMATIC RING SIGNAL

Filed Oct. 16, 1951 2 Sheets-Sheet 1

Inventor
N.E. Nilsson
By Glascock Downing Seebold
Attys.

Dec. 3, 1957 N. E. NILSSON 2,815,404

CONNECTION FOR AUTOMATIC RING SIGNAL

Filed Oct. 16, 1951 2 Sheets-Sheet 2

Inventor
N. E. Nilsson
By Mason, Kolehmainen, Rathburn & Wyss (signature) Attys.

2,815,404
Patented Dec. 3, 1957

2,815,404

CONNECTION FOR AUTOMATIC RING SIGNAL

Nils Emil Nilsson, Stockholm, Sweden, assignor to Telefonaktiebolaget L M Ericsson, Stockholm, Sweden Application October 16, 1951, Serial No. 251,486

3 Claims. (Cl. 179—22)

The present invention relates to automatic telephone exchanges and refers to a connecting device for production of automatically repeated ring signal in such telephone systems, in which each subscriber's line is provided with a preselector, and a called subscriber's line is connected with a calling subscriber's line over the preselectors by connection of the line branches to two metallic conductors pertaining to a link selected at the call. Difficulties thereby arise to hold the connected communication from the calling subscriber's line and produce repeated ring signals until an answer is obtained from the called subscriber's line.

The present invention solves this problem in a simple and satisfactory manner by means of a first relay pertaining to the calling subscriber's line which breaks the communication between one of the line branches of the line and a first one of the metallic conductors pertaining to the link selected at the call, and connects the line branch to one of the poles of the exchange battery, by means of a second relay pertaining to the link and provided with a winding which is connected over a break contact on a third relay between the second of the conductors and the other pole of the exchange battery, and by means of devices which keep the first relay actuated when a communication has been connected and ring signals shall be produced, whereby the second relay is operated in a circuit over the calling subscriber's line and closes a holding circuit for the communication simultaneously with the first conductor being connected to a ringing current generator over a winding on the third relay, which breaks the ring signal and connects a current feeding relay common to both subscriber's lines, when an answer is received.

In an embodiment according to the invention, the above mentioned first relay, which must pertain to each subscriber's line, consists of the calling relay of the subscriber's line.

The invention will be described more closely with reference to the accompanying drawings Figs. 1—2, which show an embodiment.

Figure 1:
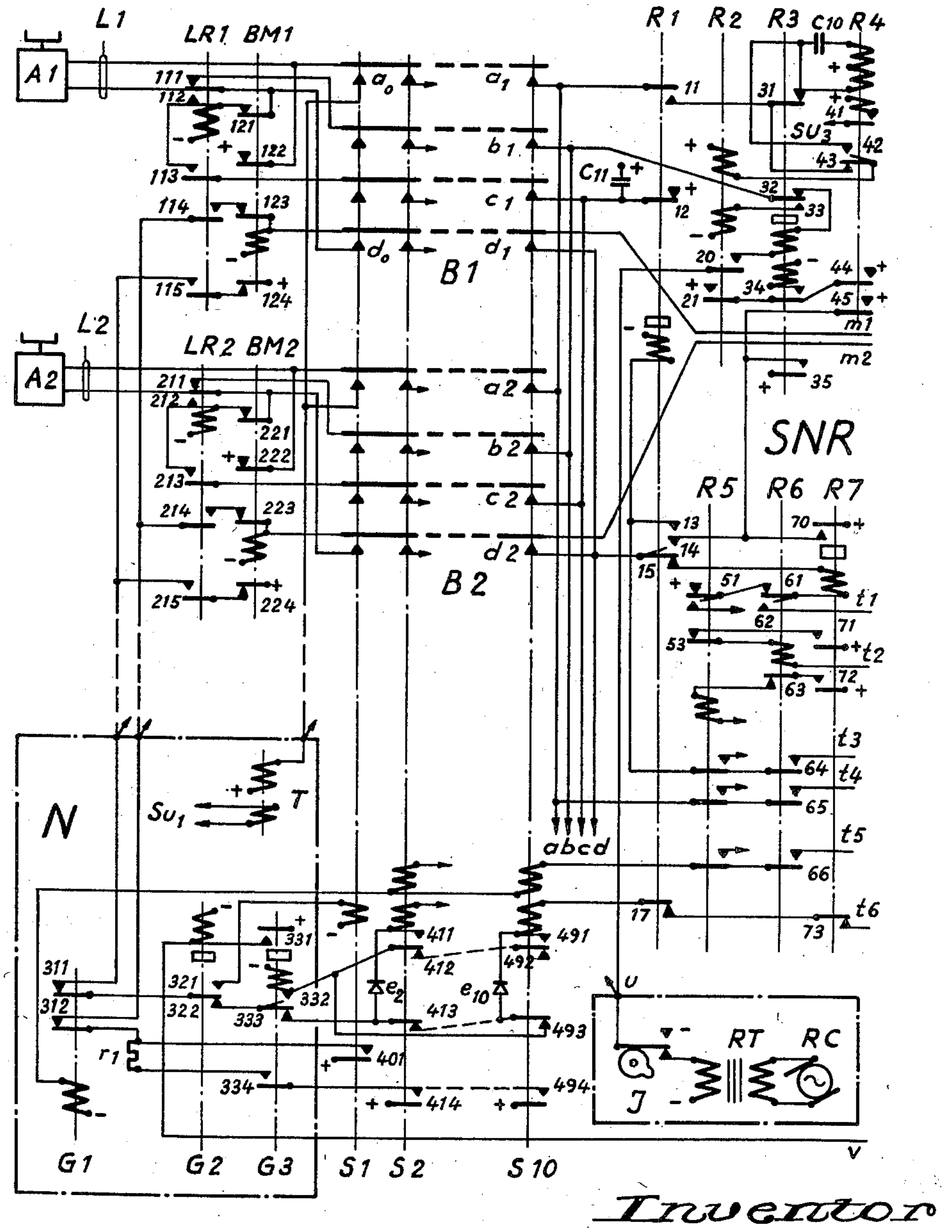
Figure 2:
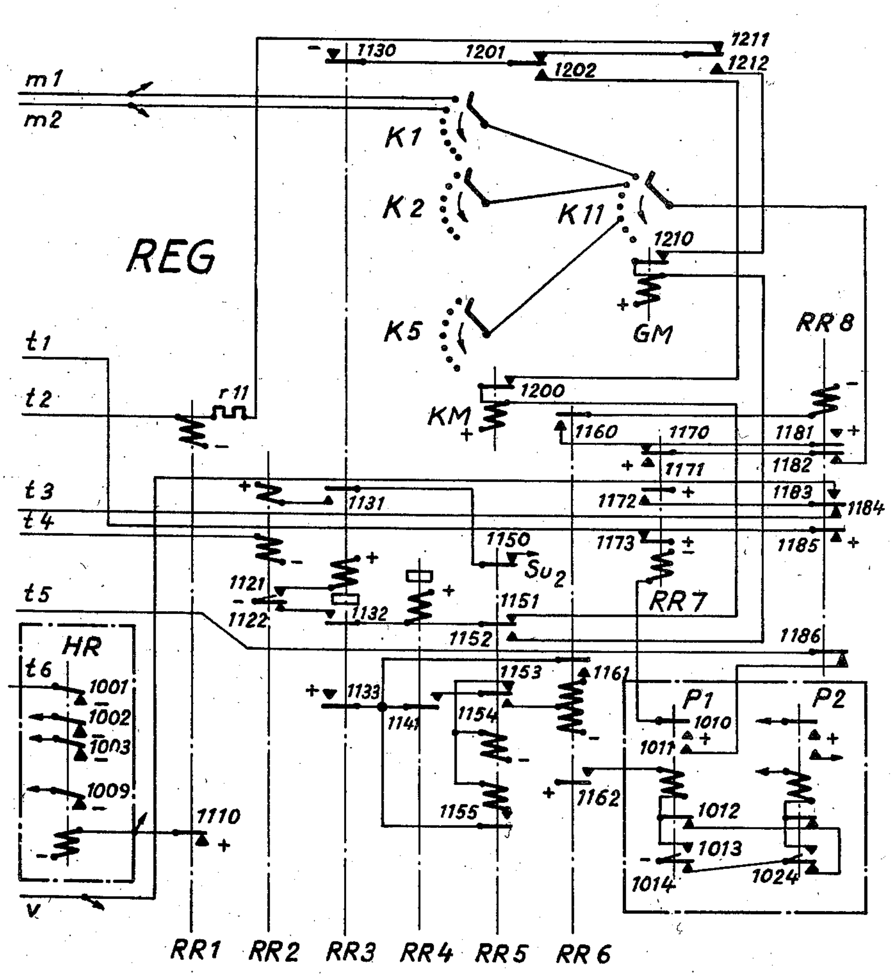

In Fig. 1, A1 and A2 designate two subscriber's instruments. Each one of the subscriber's lines L1 and L2 is provided with a line relay LR1 and LR2 and an operating bar B1 and B2 in a cross-bar switch. The operating magnets BM1 and BM2 act as cut-off relays for the subscriber's lines. The operating bars B1 and B2 are used as preselectors, over which the subscriber's lines are connected to one out of a number of links SNR. Each link has a selecting bar with a selecting magnet S2—S10 in the cross-bar switch and devices (the relays R5—R6) for connection of the link to a register REG, shown in Fig. 2. There is a call allotter N, a ringing generator RC with a transformer RT and an interrupter I common to the links SNR. All the operating bars B1, B2 are connected in parallel to the links over the contacts *a*1, *b*1, *c*1, *d*1 and *a*2, *b*2, *c*2, *d*2 and the multiplied conductors *a, b, c, d* in Fig. 1.

Upon a call from the subscriber's instrument A1 the line relay LR1 attracts in a circuit over the contacts 122 and 121. The contacts 111—115 are actuated and the following circuit is closed: +, contacts 124, 115, 311, 322 and 333, parallel circuits through the windings on all the selecting magnets S2—S10 over rectifiers *e*2—*e*10 and the contact chain 413—493, contacts 17 and 73, wire *t*6 for all the free links SNR to contact 1001 (1002—1009) on relay HR in Fig. 2. Relay HR is a normally energized relay, which is actuated as long as one of the registers REG is free.

The selecting magnets S2—S10 form a breakout row, in which only one selecting magnet at a time can attract its armature. Suppose now that the magnet S10 attracts. The contacts 491—494 are actuated. Relay G3, which is slow operating, is energized over contacts 124, 115, 311, 322, 333, 413, rectifier *e*10, contacts 491, 412, etc. and actuates the contacts 331—334. The following circuit is closed: +, contacts 494 and 334, resistance *r*1, contacts 312, 114 and 123, winding on operating magnet BM1 to negative. The operating magnet BM1 closes the contacts *a*1—*d*1, which correspond to the selecting magnet S10, and thereafter opens the contacts 121—124. The following circuit is closed: +, contacts 51 and 61, winding on relay R7, contacts 15 and *d*1, winding on operating magnet BM1 to negative. Relay R7 actuates the contacts 70—73. Each one of the relays R5 and R6 corresponds to a register REG according to Fig. 2 and they break out each other. Suppose now that relay R6 attracts its armature in the following circuit: +, contacts 71 and 53, winding on relay R6, wire *t*2, winding on relay RR1 in Fig. 2 in parallel with resistance *r*11, which is connected to negative over contacts 1211, 1201 and 1130. Relays R6 and RR1 attract. Contacts 61—66 and contact 1110 are operated. The circuit for relay R7 is switched from contacts 61 and 51 to contact 62, from *t*1, contacts 1173 and 1185 to positive.

During the above described process for connection of a register REG the line relay LR1 is kept closed by the following circuit: +, contacts 12, *c*1, 113 and 112, winding on relay LR1, to negative. When the register REG is connected the following circuit is closed: +, contacts 12, *c*1, 113 and 112, line L1 and subscriber's instrument A1, contacts *a*1 and 65, wire *t*4, winding on relay RR2, to negative. The impulse relay RR2 actuates the contacts 1121 and 1122. Relay RR3 is energized and actuates the contacts 1130—1133. The calling subscriber hears a buzzer tone when the contact 1131 is closed.

The above described connecting process for connection of a calling subscriber's line to a register is extremely quick, and it very seldom happens that two calls take place simultaneously. Should however two calls occur exactly at the same time, for example from A1 and A2, two operating magnets BM1 and BM2 will be connected simultaneously in series with resistance *r*1 over the contacts 312, 334 and 414—494. Owing to the voltage drop in resistance *r*1 the two operating magnets prevent each other from attracting. The slow relay G2 will thereby attract and actuate its contacts 321—322. The selecting magnets S2—S10 are broken out and the one, which has attracted its armature, releases. Relay G3 releases its armature, but before the release of relay G2 selecting magnet S1 has time to attract and close contact 401, which short-circuits resistance *r*1. Both operating magnets BM1 and BM2 attract their armatures and close the contacts corresponding to selecting magnet S1. The following circuit is closed for the subscriber's line L1: +, winding on the buzzer transformer T, contact *ao*, subscriber's line L1 and subscriber's instrument A1, contact *do*, winding on operating magnet BM1, to negative. Through said circuit and since contact 112 is closed, as well line-relay LR1 as operating magnet BM1 will be held. The caller hears busy tone *Su*1, which is induced in the transformer T. The subscriber's line A2 is connected in quite an analogous manner.

If upon call there is no free link and no free register, relay G3 attracts in a circuit over contacts 413—493 without any of the selecting magnets S2—S10 having attracted its armature. The contacts 331—334 are actuated and relay G2 actuates its contacts 321—322. The selecting magnet S1 closes contact 401 and the operating magnet, for example BM1, of the subscriber's line is held in series with the buzzer transformer T as described above. The caller hears a busy signal.

After a calling subscriber's line has been connected over a free link to a free register as described above, the subscriber can set the register by means of his dial. The register REG in Fig. 2 is a two-figure-register. On the first impulse in the first impulse train relay RR2 is released. Relay RR4 is energized over contacts 1122 and 1132 and actuates contact 1141. Relay RR4 is quick-actuating but slow-releasing and remains actuated until the end of the first impulse train. During the impulse train a selector is set, the stepping magnet KM and the contact rows K1—K5 of which are drawn in the figure. The magnet KM is energized over contacts 1122, 1132 and 1151. During the impulse train the following circuit is closed: +, contacts 1133, 1141, 1153, the upper winding on relay RR5, to negative. Relay RR5 is a two-step-relay, which in its first step only closes contact 1155.

After the end of the first impulse train relay RR5 in its second step attracts in the following circuit: +, contacts 1133 and 1155, the lower and the upper windings on relay RR5 in series, to negative. The contacts 1150—1154 are actuated. When the second impulse train is emitted, a selector is set, the magnet GM and the contact row K11 of which are drawn on the figure. At the same time, relay RR4 attracts its armature again and the following circuit is closed: +, contacts 1133, 1141 and 1154, the lower winding on relay RR6, to negative. Relay RR6 is a two-step-relay and closes contact 1161 in its first step. After the end of the second impulse train, relay RR4 releases again. Contact 1141 is opened and relay RR6 attracts in its second step in the following circuit: +, contacts 1133 and 1161, the upper and lower windings on relay RR6 in series, to negative. The contacts 1160 and 1162 are closed. The following test circuit is connected over contact 1160 to the called subscriber's line: —, winding on relay RR8, contacts 1160, 1170 and 1182, contact row K11 (position 1 if the second figure in the called subscriber's number is 1), contact row K1 (position 2 if the first figure in the called subscriber's number is 2), wire *m2*, to the winding on the operating magnet BM2 for the called subscriber's line.

If the called subscriber's line is busy, + is connected to its operating magnet BM2 and relay RR8 attracts its armature. The contacts 1181—1186 are actuated. If the called subscriber's line is free relay RR8 is not actuated.

Each one of the registers REG has a relay in a relay chain P1—P2, in which only one relay at a time can attract its armature. When contact 1162 is closed relay P1 is energized in the following circuit, which is supposed to be closed: +, contact 1162, winding on relay P1, contacts 1012, 1024—1014, to negative. Relay P1 actuates contacts 1010—1014. Relay RR7 is actuated over contact 1010.

If the called subscriber's line is free, the selecting magnet S10 is actuated simultaneously with relay RR7 in the following circuit: +, contacts 1011 and 1186, wire *t5*, contact 66, the upper winding on selecting magnet S10, winding on relay G1, to negative. Relay G1 actuates its contacts 311—312 and prevents a calling line to be connected together with the following connecting process for the called subscriber's line. Relay RR7 actuates the contacts 1170—1173. The following circuit is closed: +, contacts 1171 and 1182, the contact rows K11 and K1, wire *m2*, winding on the operating magnet BM2 to negative. The operating magnet BM2 closes the contacts *a2*, *b2*, *c2*, *d2*, which are selected by the selecting magnet S10 and actuates contacts 221—224. Relay R1 in link SNR is actuated in the following circuit: +, contacts 1172 and 1184, wire *t3*, contact 64, winding on relay R1, to negative. Contacts 11—17 are actuated. The current for relay R7 is broken by contact 15. Relay R7 is however slow-releasing, and therefore the operating magnets BM1 and BM2 are kept energized over contacts 70 and 14 and relay R1 is during a short time energized over contacts 70 and 13. During the time the relay R4, which is important for the invention, is energized in the following circuit: +, the middle winding on relay R4, contacts 31, 11 and *a1*, the subscriber's line L1, and the subscriber's instrument A1, contact 112, winding on the calling relay LR1, to negative. At the same time the current feeding relay R2 attracts in a circuit over contact 42 in parallel with the intermediate winding of relay R4. The contacts 20—21 and 41—45 are actuated, and the calling relay LR1 is held in spite of contact 12 being opened. The circuit for the upper winding of relay R2 is switched from contact 43 to contacts 42 and 31. The holding of the operating magnets BM1 and BM2 and relay R1 is assumed by contact 45, whereafter relay R7 can release its armature.

A ring signal to the called subscriber's instrument A2 is produced in the following circuit: ringing generator RG, transformer RT, interrupter I, wire *u*, contact 20, the upper winding on relay R3, contact 32, conducter *b*, contacts *b2* and 211, line L2, subscriber's instrument A2, contact *a2*, conductor *a*, contacts 11 and 31, a large condenser C10, and the upper winding on relay R4 to +. The condenser C10 and the upper winding on relay R4 only produce a small voltage drop for the ringing current. Contact 41 connects ringing buzzer S*u*3 to the lower winding on relay R4. This buzzer tone is transformed through the upper winding on relay R4 to the calling subscriber's instrument A1 in the following circuit: +, the upper winding on relay R4, condenser C10, contacts 31, 11 and *a1*, line L1, subscriber's instrument A1, contacts 112, 113 and *c1*, condenser C11, to +.

Relay R3 is slow and is not actuated by the ringing current through the bell of the called subscriber's instrument A2. When the called subscriber answers, relay R3 attracts in the following D. C. circuit: +, the intermediate winding on relay R4, contacts 31, 11 and *a2*, line L2, subscriber's instrument A2, contacts 211, *b2* and 32, the upper winding on relay R3, contact 20, conductor *u*, interrupter I to negative directly or through transformer RT, depending on whether the answer comes during a pause or during a signal. The contacts 31—35 are actuated. Relays R2 and LR1 release their armatures quickly, whereas relay R4 is slow-releasing owing to the large condenser C10. Relay R3 is magnetized with current over contacts 44 and 34 through its lower winding and remains thereafter actuated when relay R4 releases owing to its being slow until current-feeding relay R2 attracts its armature in the following circuit: +, the upper winding on relay R2, contacts 43 and 11, *a1* or *a2*, the in parallel connected subscriber's lines L1 and L2 with subscriber's instruments A1 and A2, contacts 111 and *b1* or 211 and *b2*, contact 33, the lower winding on relay R2 to negative. The connection has thus been set up between the subscriber's instruments A1 and A2.

If the called subscriber's line L2 had been busy, relay RR8 in register REG would have been attracted as mentioned above. The circuit for the selecting magnet S10 is broken in contact 1186 and the following circuit is closed instead: +, contacts 1172 and 1183, wire *v*, winding on relay G2 to negative. Relay G2 attracts its armature. At the same time, the current is broken for the operating magnet BM1 and for relay R7 by the contacts 1173 and 1185. The operating magnet BM1 is quick-releasing, whereas relay R7 is slow. The selecting magnet S1 is energized over contacts 124, 115, 311 and 321 and closes contact 401. The contacts *ao*, *do* are selected and closed when operating magnet BM1 attracts again and are held in the above described circuit from transformer T over contact *ao,* line L1 and contact *do.* The caller hears the busy buzzer S*u*1.

When relay R7 releases its armature register REG is set free. Relays R6, RR1, RR2 and RR3 are released. The selecting magnet KM is energized over contacts 1130, 1202 and 1200 and restores the selector with the contact rows K1—K5. Contact 1201 is closed and selecting magnet GM is energized over contacts 1130, 1212 and 1210 and restores the selector with contact row K11. Relays RR4—RR8 and relay P1 release their armatures.

I claim:

1. An automatic telephone system comprising a plurality of subscribers' lines each having two conductors, a cross-bar switch, a line relay connected for each one of said subscribers' lines, a cut-off relay connected for each one of said subscribers' lines, a link circuit, a plurality of conductors connected in parallel in said cross-bar switch and terminating in said link circuit, means to connect a calling and a called one of said subscribers' lines to said conductors, said means comprising a break contact and a make contact on said line relay, said break contact arranged to interrupt one of said conductors of a calling subscriber and said make contact arranged to connect the said interrupted one of said conductors to a holding circuit for said line relay, said holding circuit being independent of the said cut-off relay, a plurality of relays in the said link circuit and connected in series with the other of the said conductors of said calling subscriber and the said line relay, and a source of ringing current connected to the conductor of the called subscriber's line corresponding to the said one of said conductors of a calling subscriber.

2. The invention as set forth in claim 1 including a current feeding relay, and a ring trip device in the said link circuit connected in series with the said source of ringing current to disconnect the said source and open the said holding circuit, and contacts on said ring trip device to connect the said current feeding relay to the said conductors.

3. An automatic telephone system comprising a plurality of subscribers' lines, each having two conductors, a cross-bar switch having an operating bar, a line relay connected for each one of said subscribers' lines, a cut-off relay connected for each one of said subscribers' lines, a link circuit, a plurality of conductors connected in parallel in said cross-bar switch and terminating in said link circuit, means to connect a calling and a called one of said subscribers' lines to said conductors, said means comprising a break contact and a make contact on said line relay, said break contact arranged to interrupt one of said conductors of a calling subscriber and said make contact arranged to connect the said interrupted one of said conductors to a holding circuit for said relay, said holding circuit being independent of the said cut-off relay, a plurality of relays in the said link circuit connected in series with the other of the said conductors of said calling subscriber and the said line relay, a source of ringing current connected to the conductor of the called subscriber's line corresponding to the said one of said conductors of a calling subscriber, a current feeding relay and a ring trip device in the said link circuit connected in series with said source of ringing current and operating when the said called subscriber answers to disconnect the said source and open the said holding circuit to release the said line relay and connect the said current feeding relay to the said conductors.

References Cited in the file of this patent

UNITED STATES PATENTS 2,410,866 Burgener -------------- Nov. 12, 1946